J. B. WIGGINS.
PLANTER.
APPLICATION FILED MAY 8, 1908.
903,254.
Patented Nov. 10, 1908.
2 SHEETS—SHEET 2.
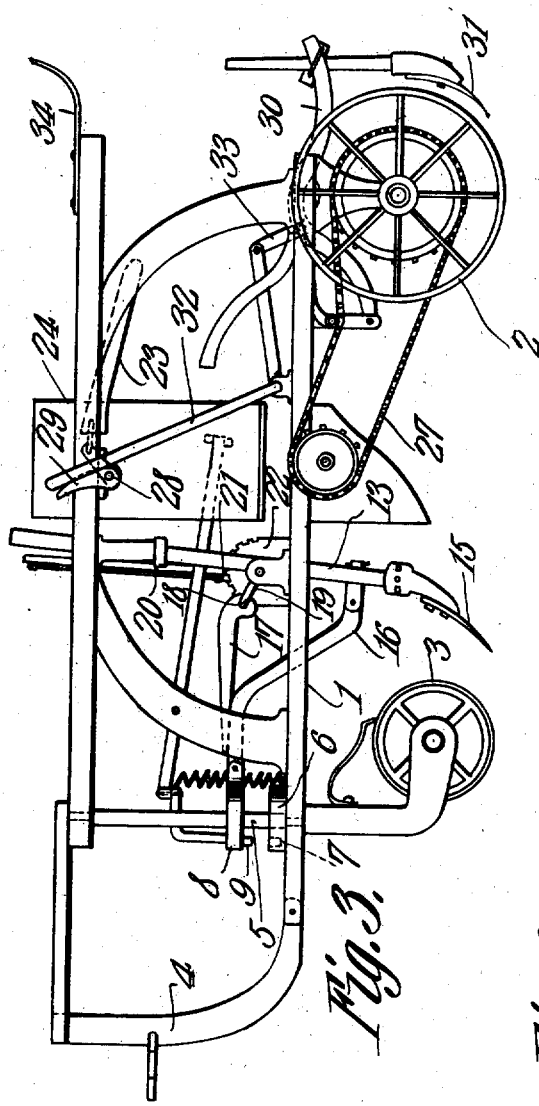
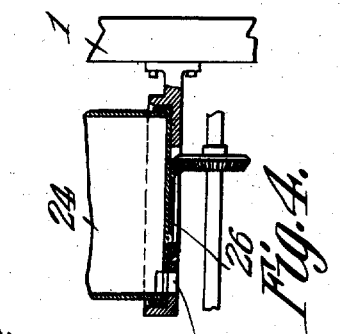
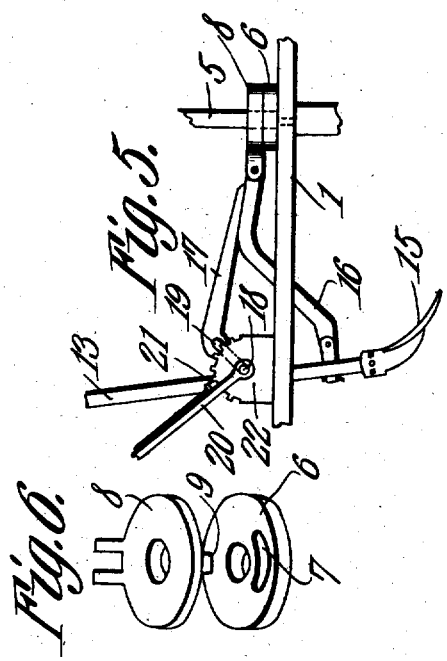
Witnesses
Inventor
John B. Wiggins.
By C. A. Snow & Co
Attorneys

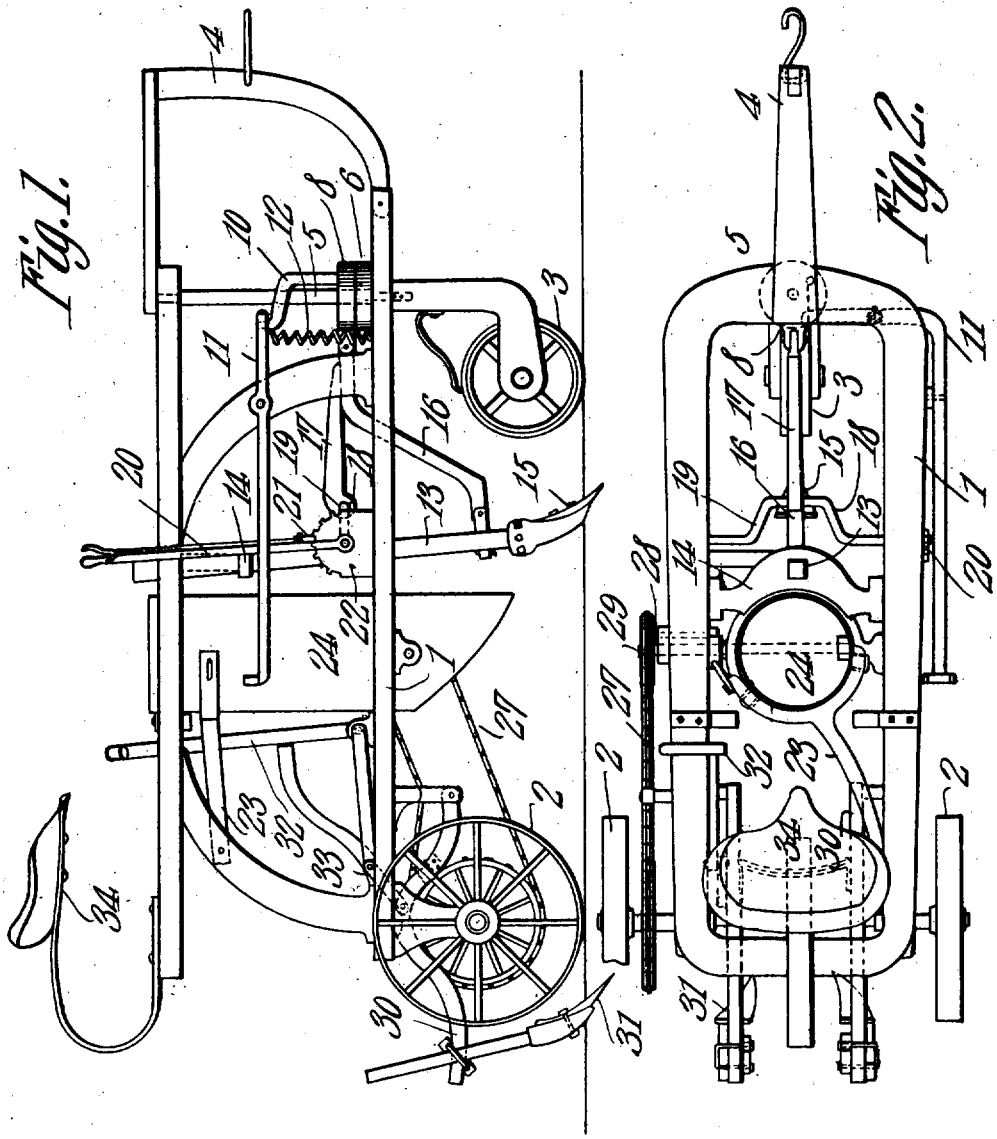

UNITED STATES PATENT OFFICE.

JOHN B. WIGGINS, OF MAY, TEXAS.

PLANTER.

No. 903,254.

Specification of Letters Patent.

Patented Nov. 10, 1908.

Application filed May 8, 1908. Serial No. 431,621.

*To all whom it may concern:*

Be it known that I, JOHN B. WIGGINS, a citizen of the United States, residing at May, in the county of Brown and State of Texas, have invented a new and useful Planter, of which the following is a specification.

This invention has relation to planters, and it consists in the novel construction and arrangement of its parts as hereinafter shown and described.

The object of the invention is to provide a planter with parts so arranged whereby the implement may make short turns at the ends of rows, and which may be used without employing a draft tongue.

With this object in view, the planter consists of a frame which is mounted at its rear end upon relatively fixed wheels and at its forward end upon a caster wheel which normally has limited castered movement and which when making a turn is freely castered. A standard is adjustably mounted upon the frame and carries a furrow opener. The said standard is operatively connected with the means for limiting the castered movement of the forward supporting wheel of the implement and as said means is manipulated to render the forward wheel freely castered, the standard is shifted so that the furrow opener carried thereby is lifted above the surface of the soil. Means is provided for shifting the said standard manually and independently of the means above mentioned. A hopper is adjustably mounted upon the frame with relation to a seed-dropping mechanism, and standards are pivotally connected with the frame and carry furrow-closing plows. A lever mechanism is provided for swinging the last said standards, and an operating means for shifting the hopper is located in the path of movement of the lever mechanism for raising and lowering the covering plows.

As used throughout the specification, the term "caster" descriptive of one of the supporting wheels, is designed to describe a wheel which is free to swing laterally in contradistinction from a wheel which is held against lateral swinging, and mechanism is provided whereby the said caster wheel may be freely castered or confined to limited castered movement as indicated.

Figure 1 is a side elevation of the planter. Fig. 2 is a top plan view of the same. Fig. 3 is a side elevation of the planter showing the opposite side thereof from that shown in Fig. 1. Fig. 4 is a sectional view of the lower portion of a seed box used upon the planter. Fig. 5 is a side elevation of a furrow opening plow used upon the planter. Fig. 6 is a perspective view of juxtaposed disks used upon the planter to govern the condition of the caster wheel, said view showing the disks separated.

The planter consists of the frame 1 which is supported at its rear end upon the relatively fixed ground wheels 2. The forward portion of the frame is supported by the caster wheel 3. The forward portion of the said frame is provided with a clevis support 4. The spindle of the caster frame 5 is pivoted in the forward portion of the frame 1 and is provided with a collar 6 having an elongated groove 7. The collar 8 is slidably mounted upon the spindle of the caster frame 5 and is held against rotation thereon. Said collar 8 is provided with a lug 9 which normally lies in the groove 7 and is adapted to limit the castered movement of the wheel 3. An arm 10 is mounted upon the collar 8 and is pivotally connected with one end of a lever 11 which is fulcrumed to the frame 1. One end of the spring 12 is connected with the lever 11 and the other end thereof is connected with the frame 1. Said spring is under tension with a tendency to hold the collar 8 in engagement with the collar 6. The standard 13 is mounted for vertical movement in the guides 14 carried by the frame 1. The furrow opener 15 is mounted upon the lower end of the standard 13. The lever 16 is pivotally connected at one end with the collar 8 and at its opposite end with the standard 13, so that the said standard 13 moves vertical in unison with the collar 8. The arm 17 is mounted upon and attached at its forward end to the link 16 and receives the bell-crank portion 19 of a shaft 18 journaled at its end portions in suitable bearings provided upon the frame. The lever 20 is attached to the shaft 18 and it is provided with a pawl mechanism 21 for engagement with the gear segment 22. By manipulating the lever 20 the shaft 18 may be partially rotated, whereby the rear end of the link 16 can be raised or lowered without moving the collar 8, and consequently the standard 13 may be shifted without moving the collar 8. The arm 23 is pivotally mounted upon the frame 1 and supports the hopper 24. The seed feeding mechanism 25 is located under the hopper 24, and a plate 26 is carried by the hopper and is adapted to be actuated by the mechanism 25. The sprocket chain 27 is adapted to transmit movement from the rear axle of the implement to the seed feeding mechanism 25.

The stub shaft 28 is journaled for rotation upon the frame 1 and is operatively connected with the arm 23. The lever 29 is mounted upon the shaft 28. The draw-bars 30 are pivotally connected with the frame 1 and carry the covering plows 31. The draw-bars 30 are connected together and the lever 32 is fulcrumed upon the frame 1 and is connected by means of a link 33 with one of the draw-bars 30. The lever 29 lies in the path of movement of the lever 32 and the lever 32 is located upon one side of the frame 1, while the lever 11 is located upon the opposite side thereof. The operator's seat 34 is mounted upon the frame 1 and the said levers 11 and 32 are adapted to be operated by the feet of one occupying the seat 34.

The operation of the planter is as follows: Under ordinary conditions, and as the implement is drawn along a row, the collar 8 is in engagement with the collar 6, and consequently the caster frame 5 has limited castered movement, which permits of the draft team being guided so that the implement can be kept in proper alinement. When the end of a row is reached the operator depresses the lever 11 and the lever 32. Thus, the wheel 3 becomes freely castered and the furrow opener 15 is lifted above the surface of the soil. At the same time the hopper 24 is lifted out of contact with the seed-dropping mechanism 25 and the covering plows 31 are lifted above the surface of the soil. The hopper 24 is lifted as above described in view of the fact that the lever 29 is located in the path of movement of the upper end portion of the lever 32. Consequently, when the said lever 32 is swung, it strikes the lever 29, and moves the same, which, in turn, moves the arm 23 upon its pivot, to which the hopper 24 is attached, and, consequently, the hopper 24 is lifted into the elevated position, as illustrated in Fig. 3 of the drawing. Thus the seed from the hopper to the seed-dropping mechanism is stopped and the plows are raised above the soil, and as the wheel 3 is rendered freely castered the implement may make a short turn to pass over the field in an opposite direction. Thus, it will be seen that an implement devoid of a guiding tongue is provided and one which may be manipulated so as to preserve proper alinement of planting and at the same time accomplish short turning at the ends of the rows.

What is claimed is:—

1. An implement comprising a frame, relatively-fixed wheels supporting the rear end thereof, a caster wheel supporting the forward end thereof, a lever-operated mechanism for normally confining the caster wheel to limited castered movement and which when manipulated renders the said wheel freely castered, a shiftable standard carried by the frame and being operatively connected with the lever-operated mechanism.

2. An implement comprising a frame, relatively fixed wheels supporting the rear end thereof, a caster wheel supporting the forward end thereof, a collar mounted upon the shank of the caster yoke of said wheel and having an elongated groove, a clutch member slidably mounted upon said shank and having a lug which normally lies within said groove, means for holding said clutch member against rotation, and means for moving the same along the shank.

3. An implement comprising a frame, relatively fixed wheels supporting the rear end thereof, a caster wheel supporting the forward end thereof, means for confining the caster wheel to normally limited castered movement, and a shiftable standard carried by the frame and being operatively connected with said means.

4. An implement comprising a frame, relatively-fixed wheels supporting the rear end thereof, a caster wheel supporting the forward end thereof, means for confining the caster wheel to normally limited castered movement, a shiftable standard carried by the frame and being operatively connected with said means, and means for shifting the standard independent of the caster-confining means.

In testimony that I claim the foregoing as my own, I have hereto affixed my signature in the presence of two witnesses.

JOHN B. WIGGINS.

Witnesses:
J. T. MILLER,
W. O. GARNETT